US008295654B1

(12) United States Patent
Efimov

(10) Patent No.: US 8,295,654 B1
(45) Date of Patent: Oct. 23, 2012

(54) HIGH-SPEED SELF-ADJUSTING PHOTONIC CONVERTER

(75) Inventor: Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 383 days.

(21) Appl. No.: 12/703,753

(22) Filed: Feb. 10, 2010

(51) Int. Cl.
*G02F 1/035* (2006.01)
(52) U.S. Cl. .............................................. 385/2; 385/37
(58) Field of Classification Search .................. 385/2, 37
See application file for complete search history.

(56) References Cited

U.S. PATENT DOCUMENTS 6,137,442 A * 10/2000 Roman et al. ................. 342/375
6,640,020 B2   10/2003 Ionov

OTHER PUBLICATIONS

Dagli, N., "High-Speed Photonic Devices," Series in Optics and Optoelectronics, CRC Press, Taylor and Francis Group, LLC., Boca Raton, Florida pp. 31-41 (2007).

Hukriede, J., "Fabrication and application of holographic Bragg gratings in lithium niobate channel waveguides," J. Phys. D: Appln. Phys. 36 (2003).
Othonos A., et al., "Fiber Bragg Grating: fundamentals and application in telecommunication and sensing," Chapter 5, pp. 203-205, Artech House, Boston, London (1999).
U.S. Appl. No. 12/234,980, filed Sep. 2008, Efimov, Oleg.

* cited by examiner

*Primary Examiner* — Jerry Rahll
(74) *Attorney, Agent, or Firm* — Janus Law Group

(57) ABSTRACT

A device is disclosed. The device contains a first electro-optical waveguide comprising at least one first grating, a second electro-optical waveguide comprising at least one second grating, a plurality of electrodes disposed adjacent to the first grating and configured to impose an electric field through the first electro-optical waveguide to modify spectra of the first grating, a fiber amplifier configured to propagate a laser radiation between the first electro-optical waveguide and the second electro-optical waveguide, and at least two circulators associated with the fiber amplifier and the first electro-optical waveguide and the second electro-optical waveguide and configured to provide unidirectional propagation of the laser radiation along the fiber amplifier.

16 Claims, 10 Drawing Sheets

HIGH-SPEED SELF-ADJUSTING PHOTONIC CONVERTER

FIELD OF THE INVENTION

The present disclosure generally relates to the processing of optical signals. More particularly, it relates to high-speed conversion of electrical pulses into optical pulses of approximately the same duration.

BACKGROUND

The prior art relevant to the proposed method is described in a book by N. Dagli "High-speed photonic devices," CRC Press, 2007, Chapter 3; U.S. Pat. No. 6,640,020 (S. Ionov, "Method and apparatus for electro-optic delay generation of optical signals," U.S. Pat. No. 6,640,020, October 2003); and the review by J. Hukriede, D. Runde, D. Kip, "Fabrication and application of holographic Bragg gratings in lithium niobate channel waveguides," J. Phys. D: App. Phys. v. 36, pp. R1-R16. 2003; U.S. patent application Ser. No. 12/234,980 (HRL 071220), filed Sep. 22, 2008 for "High-speed amplitude electro-optical modulator" by Oleg Efimov, entire content of all of which is incorporated herein by reference.

A common way for conversion of electrical pulses into optical pulses is the use of Mach-Zehnder electro-optic modulators wherein an applied electrical signal controls the phase of one of the interfering beams. A novel conversion of electrical pulses into optical pulses is presently disclosed.

SUMMARY

According to a first aspect, a device is disclosed, comprising: a first electro-optical waveguide comprising at least one first grating; a second electro-optical waveguide comprising at least one second grating; a plurality of electrodes disposed adjacent to the first grating and configured to impose an electric field through the first electro-optical waveguide to modify spectra of the first grating; a fiber amplifier configured to propagate a laser radiation between the first electro-optical waveguide and the second electro-optical waveguide; and at least two circulators associated with the fiber amplifier and the first electro-optical waveguide and the second electro-optical waveguide and configured to provide unidirectional propagation of the laser radiation along the fiber amplifier.

According to a second aspect, a device is disclosed, comprising an electro-optical waveguide comprising a phase-shifted Bragg grating, wherein the electro-optical waveguide further comprises a first end and a second end; a plurality of electrodes proximate to the phase-shifted Bragg grating and configured to impose an electric field through the electro-optical waveguide to modify spectra of the phase-shifted Bragg grating; a fiber amplifier configured to propagate a laser radiation between the first end and the second end; and a circulator associated with the fiber amplifier and the electro-optical waveguide and configured to provide unidirectional propagation of the laser radiation along the fiber amplifier.

According to a third aspect, a method of converting electrical pulses into optical pulses is disclosed, comprising: propagating a laser radiation between a first electro-optical waveguide and a second electro-optical waveguide using a fiber amplifier, wherein the first electro-optical waveguide comprises a first grating and a plurality of electrodes adjacent to the first grating to impose an electric field to modify spectra of the first grating, wherein the second electro-optical waveguide comprises a second grating, wherein the first electro-optical waveguide and the second electro-optical waveguide are connected by two circulators configured to provide unidirectional propagation of the laser radiation along a first direction; and imposing electric pulses to the plurality of electrodes in a direction substantially opposite the first direction.

According to a fourth aspect, a method of converting electrical pulses into optical pulses is disclosed, comprising: propagating a laser radiation between a first end and a second of an electro-optical waveguide using a fiber amplifier, wherein the electro-optical waveguide comprises a phase-shifted Bragg grating and a plurality of electrodes adjacent to the phase-shifted Bragg grating to impose an electric field to modify spectra of the phase-shifted Bragg grating, wherein the first end and the second end are connected by a circulator configured to provide unidirectional propagation of the laser radiation along a first direction; and imposing electric pulses to the plurality of electrodes in a direction substantially opposite the first direction.

According to a fifth aspect, a ring cavity laser is disclosed, comprising: a first electro-optical waveguide comprising at least one first grating; a second electro-optical waveguide comprising at least one second grating; a plurality of electrodes disposed adjacent to the first grating and configured to impose an electric field through the first electro-optical waveguide to modify spectra of the first grating; a fiber amplifier configured to propagate a laser radiation between the first electro-optical waveguide and the second electro-optical waveguide; a first circulator disposed between an input of the first electro-optical waveguide and an output of the second electro-optical waveguide; and a second circulator disposed between an output of the first electro-optical waveguide and an input of the second electro-optical waveguide, wherein the first circulator and the second circulator are configured to provide unidirectional propagation of the laser radiation along the fiber amplifier.

BRIEF DESCRIPTION OF THE DRAWINGS

FIG. 5a depicts an exemplary Amplitude Electro-Optical Modulator (AEOM).

FIG. 5b depicts calculated changes in intensities of a Continuous Wave (CW) laser beam shown in FIG. 5a.

FIG. 7b is a graph of a spectral structure of the transmission window in the center of spectrum shown in FIG. 7a.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

Currently, high-speed modulators use different modifications of Mach-Zehnder interferometers and require a driving voltage of about 1V to 5V. Exemplary embodiments of the present disclosure may use direct modulation of light reflected from sharp spectral fronts of optical gratings. This allows for lower driving voltages than previous devices to control the intensities of transmitted or reflected beams by shifting grating spectra by applying an electrical field to an electro-optically active waveguide.

Figure 1A:
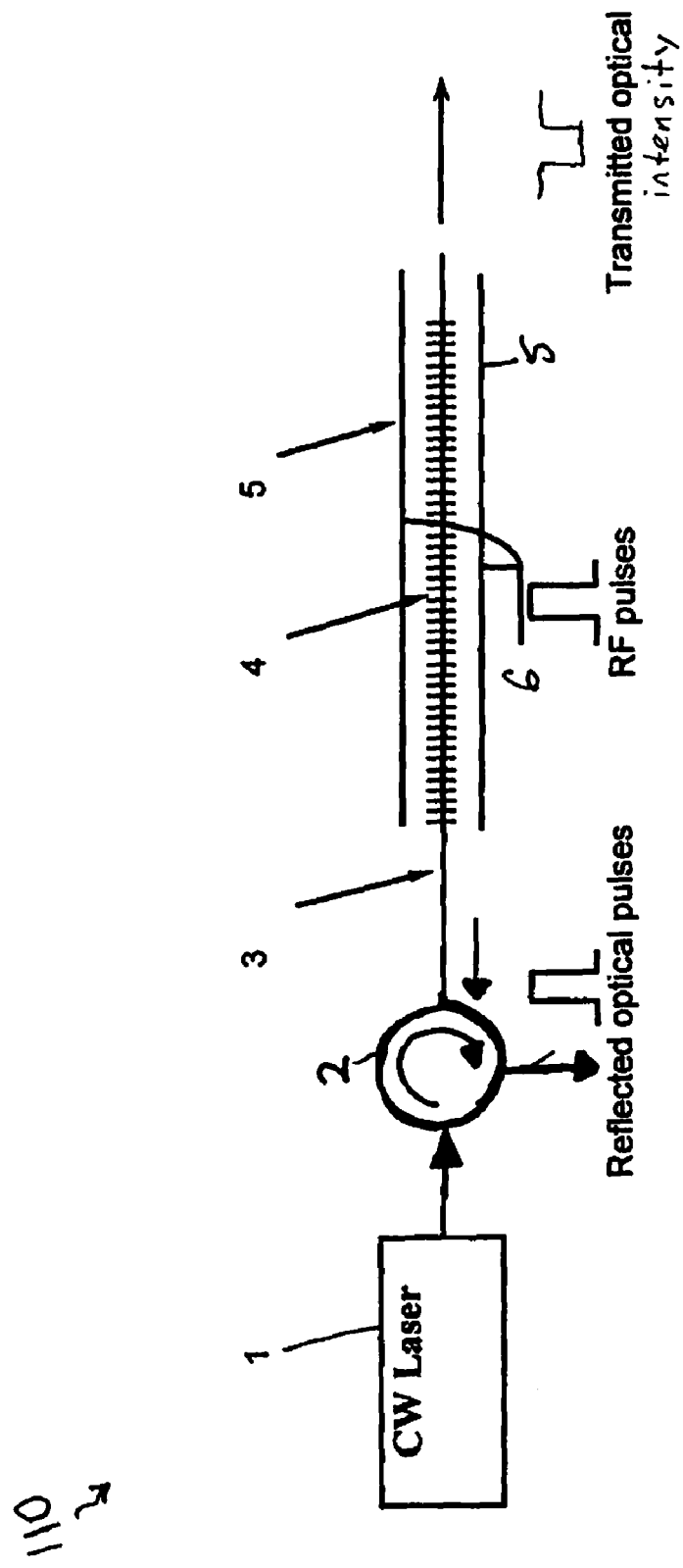
FIG. 1a depicts an Amplitude Electro-Optical Modulator (AEOM) as known in the Prior Art.
Figure 1B:
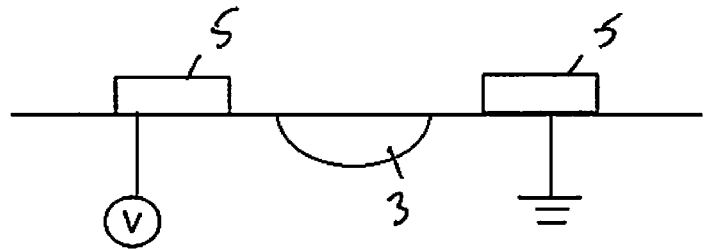
FIG. 1b depicts two electrodes disposed adjacent to a waveguide as known in the Prior Art.
Figure 1C:
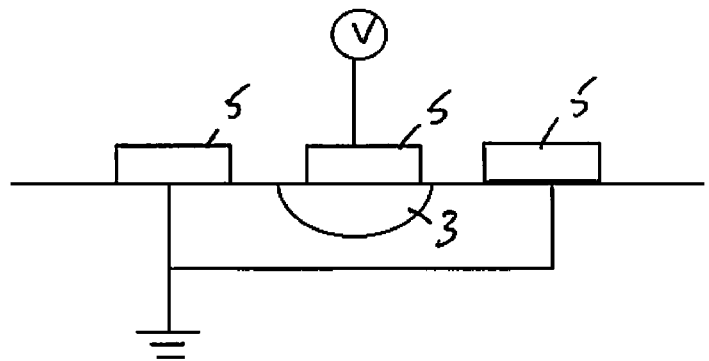
FIG. 1c depicts three electrodes disposed adjacent to a waveguide as known in the Prior Art.

FIG. 1a is a schematic representation of an exemplary Amplitude Electro-Optical Modulator (AEOM) 110, where radiation of a narrowband Continuous Wave (CW) laser 1 passes through a waveguide 3, such as, for example, a Ti:LiNbO$_3$ waveguide or another electro-optically active waveguide, with a narrowband grating 4. The optical reflections from all layers (or grooves) of the grating 4 exist concurrently and are continuous due to the utilization of the CW laser 1. When a voltage, electrical pulse or a radio frequency (RF) pulse 6, is applied to electrodes 5 located proximate to the waveguide 3, the refractive index of the waveguide 3 and phase relations of beamlets reflected from the grating 4 layers are modified. The electrodes 5 may be disposed on both sides of the waveguide 3, as shown in FIGS. 1a and 1b or disposed above the waveguide 3, as shown in FIG. 1c depending on the orientations of the electro-optical material axes.

A change in the index of refraction results in a spectral shift of the grating spectrum. If the spectrum of the laser is in the region of grating spectral fronts, even a small shift of the grating spectrum results in considerable modulation of transmitted or reflected beam intensity. Therefore, rather small voltages applied to the electrodes 5 are enough to control or modify transmission/reflection intensities.

Figure 2:
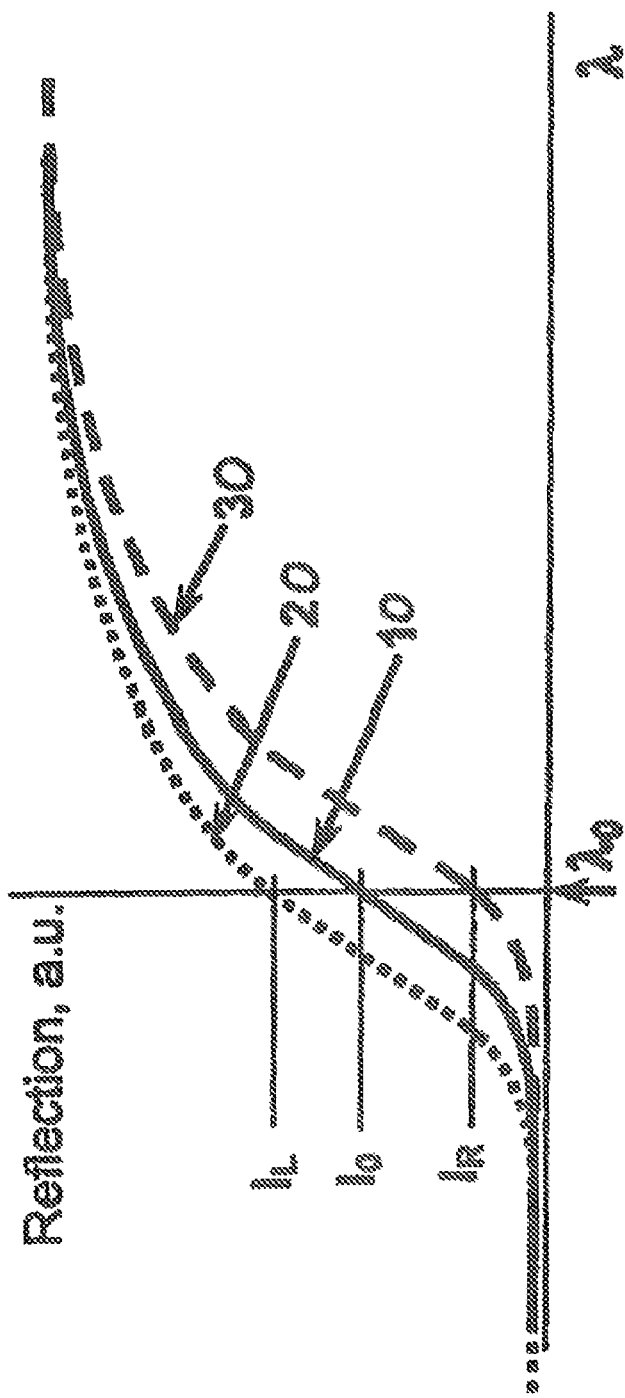
FIG. 2 is a graph of reflection efficiency versus wavelength for the AEOM depicted in FIG. 1.

In FIG. 2, the front edge of a grating reflection spectrum is shown by curve 10. Narrowband CW laser radiation at wavelength $\lambda_0$ is reflected at an intensity $I_0$. Application of positive or negative voltage to the electrodes 5 (shown on FIGS. 1a, and 1c) results in modification of the refractive index and spectral shifts of reflection spectra to the left (curve 20 shown in FIG. 2) or right (curve 30 shown in FIG. 2) relative to the initial curve 10 shown in FIG. 2. Because of spectral shifts, the intensities $I_L$, $I_R$ of reflections are modified. Thus, modulating the voltage of the applied electrical signal allows modulation of the intensities of transmitted or reflected signals. However, the grating reflection spectrum should be narrow with a sharp transition between high and low reflections. As a result, small changes in the voltage of applied electrical signals may result in high modulations of reflected/transmitted beams in the range from $I_R$ to $I_L$.

The response of the grating 4 (changes in transmitted and reflected signals) results from coherent combining (constructive or destructive interference) of beamlets reflected from all layers of grating. The gratings 4 may be implemented as grooves on a waveguide or layers of varying indices of refraction within a waveguide as known in the art. Hereinafter, references to layers will be intended to include waveguides with either grooves or layers. The embodiment shown in FIG. 1a, where the voltage, electrical pulse or the RF pulse 6 applied to electrodes 5 has no specific direction of propagation, has a frequency restriction because the minimum time of the grating response is equal to the time required for a round-trip of the optical signal over the grating. For the total response of the grating, the optical signal has to reach the last groove or layer of the grating 4 and reflect from this layer (as well as from all the previous layers) and travel back to the beginning of the grating to interfere with the reflection from the first layer. According to the prior art, the voltage, electrical pulse or the RF pulse 6 is applied to the entire length of the electrodes 5 during this time to modify reflections from all the layers of the grating. For the grating with length L and a refractive index n, this time $\tau$ is $$\tau = \frac{2nL}{c}$$

where c is the speed of light in the vacuum. Therefore, the frequency limit $F_{lim}$ of RF signal is $$F_{lim} = \frac{c}{2nL}$$

For exemplary purposes, for a grating with length of about 1 cm on a Ti:LiNbO$_3$ waveguide, this time $\tau$ is about $1.4 \times 10^{-10}$ s. Therefore, the maximum operation frequency is about 7 GHz. If the frequency of modulation is lower than $F_{lim}$, either transmitted or reflected beams can be used as modulated beams, and the points of electrical signal application to the electrodes are not important.

Figure 3:
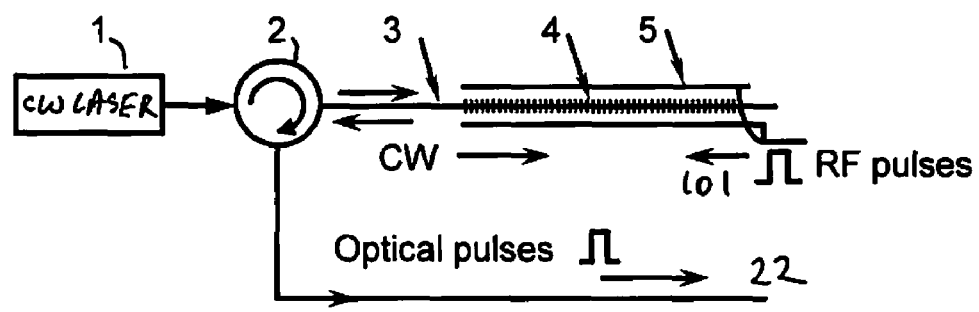
FIG. 3 depicts another example of an AEOM as known in the Prior Art.

For high frequency applications (using high frequency radio signals or RF signals), the time of the electrical signal change is much shorter than the time of optical beam propagation through the grating. FIG. 3 is a schematic representation of an AEOM 120 for high speed modulation, where radiation of a narrowband CW laser 1 passes through an optical circulator 2 and then a waveguide 3, such as, for example, a Ti:LiNbO$_3$ waveguide or another electro-optically active waveguide, with a narrowband grating 4. The optical reflections from all layers (or grooves) of the grating 4 exist concurrently and are continuous due to the utilization of the CW laser 1. By propagating a voltage, electrical pulse or an RF pulse 101 along the electrodes 5 in a direction that is substantially opposite the propagation path of the radiation from the narrowband CW laser 1, the refractive index of the waveguide 3 and phase relations of beamlets reflected from the grating 4 layers get modified.

In one example, the speed of RF pulse 101 propagation through the electrodes 5 and the speed of optical pulse propagation through the waveguide 3 are substantially the same. As a result, the RF pulse 101 will collect all the reflected optical beamlets with modified phases analogous to a snow-plough collecting snow in front of it. Therefore, when the RF pulse 101 reaches the beginning of waveguide 3 (adjacent to the circulator 2), all the beamlets with modified phases are coherently combined and constructively interfere with each other, resulting in a short pulse reflection corresponding to the applied RF pulse 101 modifying the refractive index of the waveguide 3.

Still referring to FIG. 3 when the RF pulses 101 are short (e.g., high-speed applications), the refractive index of only a small fraction of the grating is modified at a time. Therefore, the intensity of the transmitted CW signal decreases only a small amount during the time of electrical pulse 101 propagation through the waveguide 3. However, the reflected signal has considerable intensity as a result of coherent summing (or constructive interference) of the reflections from the entire grating. Here, it may be desirable to utilize sampled input RF pulses 101 with a small duty cycle (e.g., <50%) to enable the recovery of light energy stored in the grating 4 during the time between RF pulses 101. A lower duty cycle may result in substantially total recovery of the light energy transmitted through the grating 4 and high reproducibility of intensity of the reflected optical pulses.

Figure 5B:
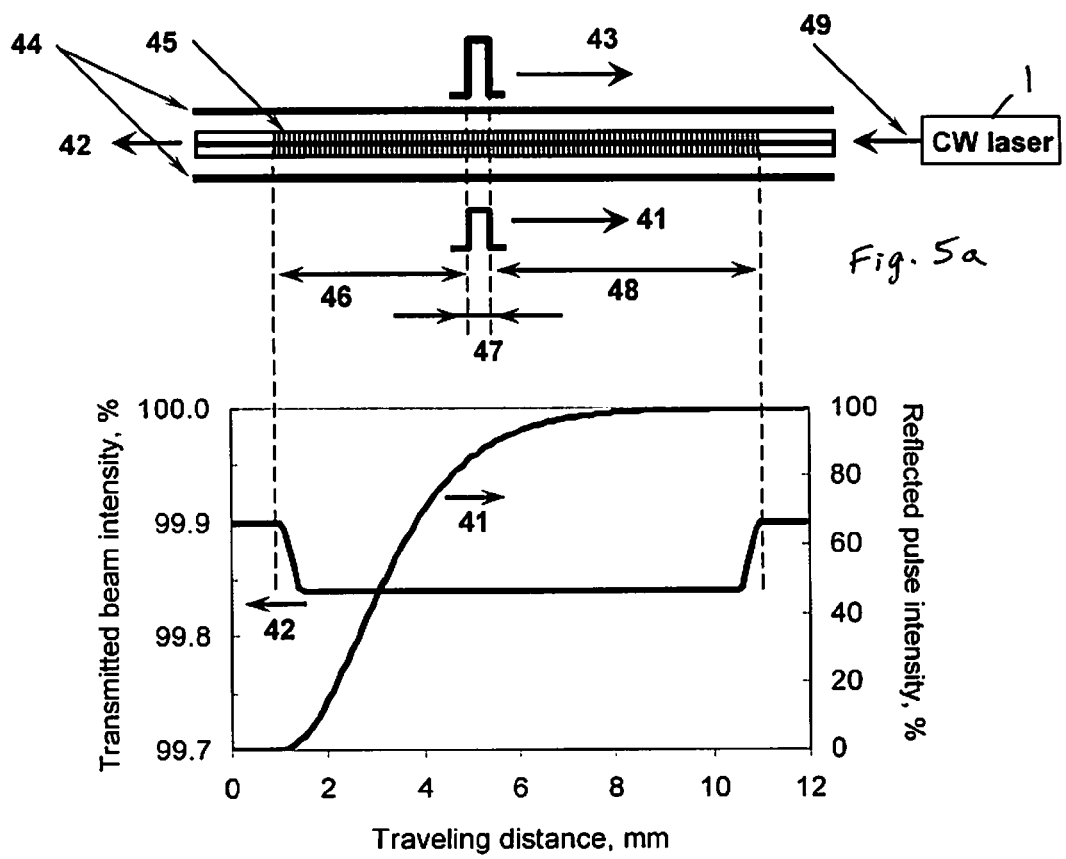

FIGS. 5a and 5b depict calculated changes in reflected 41 and transmitted 42 intensities of CW laser beam 49 that depend on the traveling distance of a short (~2 ps) electrical pulse 43 propagating through the electrodes 44 surrounding waveguide with length of 10 mm-grating 45. Referring to FIG. 5a, during propagation of electrical pulse 43 through the electrodes 44, the electrical pulse 43 modifies the refractive index of grating 45 and coherently collects all modified reflections from grating layers. Coherent collection of reflections requires the speed of light propagation through the waveguide has to be approximately equal to the speed of electrical pulse propagation through the electrodes as discussed above. The interference of reflections develops an optical pulse 41 (shown in FIG. 5a) with intensity (shown in FIG. 5b) growing with the number of interfering reflections proportional to the traveling distance of electrical pulse 43. The same electrical pulse 43 splits the grating 45 in three consecutive sub-gratings 46, 47 and 48. The first 46 and third 48 gratings have unmodified refractive index while the second grating 47 has refractive index modified by electrical field of propagating pulse 43. Splitting the grating into three parts decreases the intensity of the transmitted beam. However, this decrease is negligible because of the small change in refractive index of the second grating 47 and the short length of electrical pulse 43 relative to the total length of grating 45 as a whole.

Figure 4:
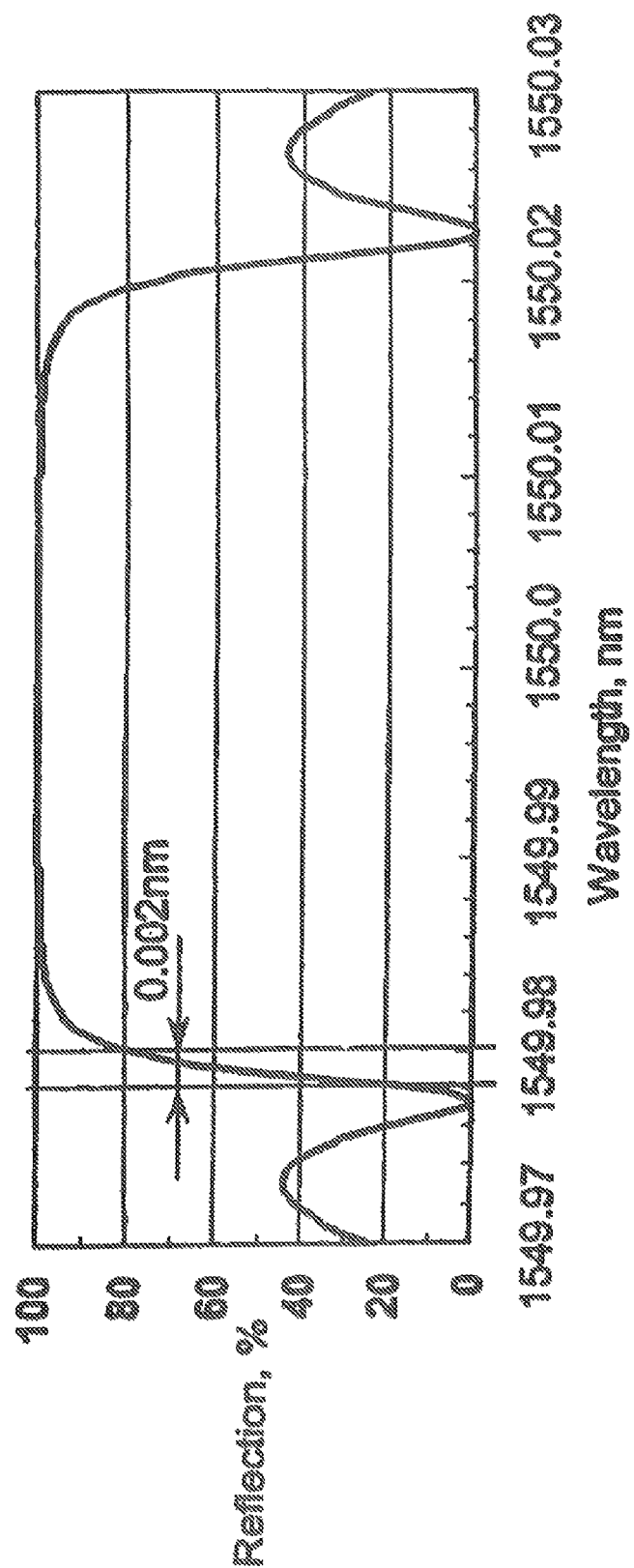
FIG. 4 is a graph of the calculated reflection percentage versus wavelength of a 4 cm length grating on a Ti:LiNbO$_3$ waveguide.

In FIG. 3, a 4 cm-length grating for a λ=1550 nm is on a Ti:LiNbO$_3$ waveguide with a diameter D$_{wg}$ of about 3 μm and a refractive index n=2.16. The calculated spectrum of this grating is shown in FIG. 4. According to FIG. 4, the range where reflected beam intensity varies from 20% to 80% corresponds to a spectral range δλ=2 picometers (pm). To provide this spectral shift, the refractive index of waveguide may be changed by $$\delta n = \frac{\delta \lambda}{\lambda} n$$

For example, the largest electro-optic coefficient in LiNbO$_3$ (r$_{33}$=30.8×10$^{-6}$ μm/V), which is introduced when the polarized fields of the light and applied voltage are in the c-axis of the LiNbO$_3$ crystal, may be utilized to estimate the voltage V$_{mod}$ required for such a modification of refractive index. The change in refractive index may be calculated using the well-known relation (see for example, N. Dagli "High-speed photonic devices," CRC Press. 2007, Chapter 3, p. 32):

$$\delta n = -n^3 r_{33} \frac{V_{mod}}{2 D_{wg}}$$

Therefore, the modulation voltage may be calculated to be $$|V_{mod}| = \pm \frac{2 D_{wg}}{n^2 r_{33}} \frac{\delta \lambda}{\lambda} \approx 0.06 \text{ V}$$

which is much lower than the driving voltage of existing Mach-Zehnder modulators. However, the modulation voltage V$_{mod}$ may be higher in practical applications due to a larger distance between the electrodes 5 (as shown in FIG. 3), imperfections of implementation, etc.

As shown above, the speed of the RF and optical pulse propagation may be substantially the same. An example of a desirable tolerance such that the RF and optical propagation speeds for one embodiment of the present disclosure are substantially the same is described below. A waveguide has a grating of length L. If RF pulse propagates through electrodes 5 along the waveguide 3 with a speed V$_{RF}$, the total time of propagation t$_{RF}$ is $$t_{RF} = \frac{L}{V_{RF}}$$

The time t$_{OP}$ of the optical pulse propagation through the waveguide 3 may differ from the time t$_{RF}$ not more than the duration of the RF pulse τ$_{RF}$ to provide good overlapping and interference between the beamlets reflected from all the layers of grating. Taking into account that the speed of the optical pulse V$_{OP}$ is approximately equal to the speed of RF pulse propagation V$_{RF}$, and it is equal to c/n where c is the speed of light in vacuum and n is the refractive index of waveguide, the tolerance ΔV/V$_{OP}$ is $$\tau_{RF} = t_{RF} - t_{OP} = L \left( \frac{1}{V_{RF}} - \frac{1}{V_{OP}} \right) = L \frac{\Delta V}{V_{OP}^2} = \frac{L n}{c} \frac{\Delta V}{V_{OP}} \text{ or } \frac{\Delta V}{V_{OP}} = \frac{c \cdot \tau_{RF}}{L n}$$

For example, for a 5 cm grating on a Ti:LiNbO$_3$ waveguide (e.g., n=2.16 and c=3×10$^8$ m/s) operating at a 20 GHz frequency (i.e., τ$_{RF}$ is equal to a half period or 0.5/(2×10$^{10}$)s or 2.5×10$^{-11}$ s), the tolerance of the speeds should be no more than $$\frac{\Delta V}{V_{OP}} \leq \frac{3 \cdot 10^8 m/s \cdot 2.5 \cdot 10^{-11} s}{5 \cdot 10^{-2} m \cdot 2.16} \approx 0.07 \text{ or } 7\%$$

Changes in grating length or RF frequency will correspondingly result in changes in tolerance between the RF and optical propagation speeds.

Although the AEOM 120 depicted in FIG. 3 may be implemented in high frequency applications, it may be difficult to fix spectral positions of laser line and grating 4 relative to each other with very high accuracy (better than 1 picometer). Any changes in environment (vibrations, temperature, etc.) may influence an operation of the AEOM 120 in FIG. 3. For instance, the change in grating temperature of ~0.1° C. may result in grating spectrum shift of ~6 picometers and change in the grating operation from transmission to reflection mode. Therefore, self-adjusting schemes for such devices are very desirable and are further described next.

According to the present disclosure, high-speed electrical pulses may be converted into optical pulses of approximately the same duration. In one exemplary embodiment, optical pulses are extracted from narrowband unidirectional laser by propagating electrical signals through the electrodes surrounding a waveguide developed in electro-optically active material with a grating on its surface or in the bulk. According to the present disclosure, optical pulses may be extracted at frequency over hundreds of gigahertz with rather low-voltage electrical signals of <<1 volt.

Figure 6:
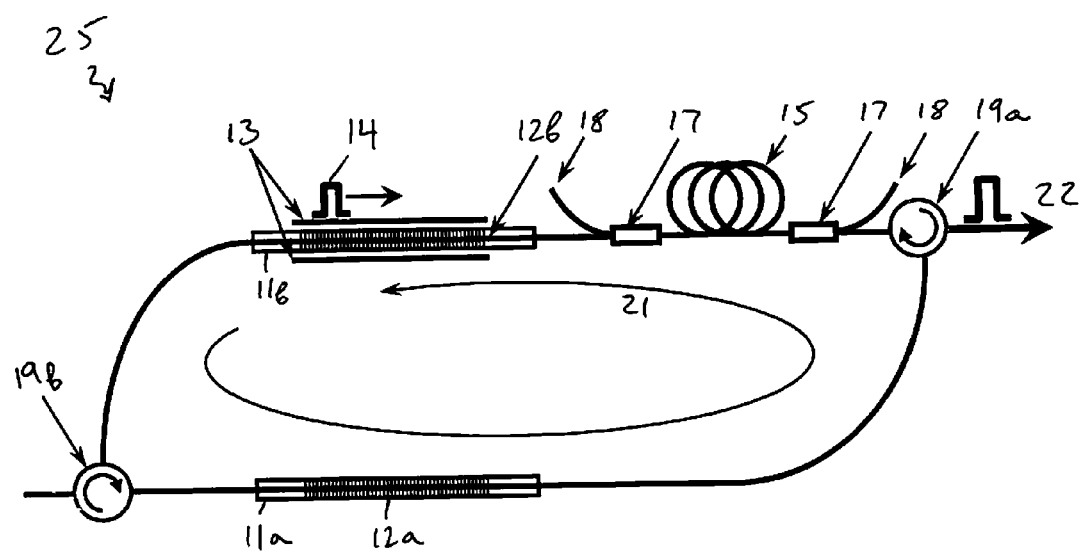
FIG. 6 depicts a self-adjusting converter of electrical pulses into optical output according to the present disclosure.

In one exemplary embodiment according to the present disclosure, a self-adjusting converter of electrical pulses into optical output is shown in FIG. 6. FIG. 6 depicts a ring cavity laser 25 that may be configured with a fiber amplifier 15 to provide light generation, the waveguides 11a and 11b, with the gratings 12a and 12b to provide the narrowband transmission spectrum setting the lasing wavelength of the ring cavity 25. The ring cavity laser 25 may further be configured with circulators 19a and 19b to provide unidirectional propagation of laser radiation 21 and to prevent the crosstalk between gratings 12a and 12b and to make gratings 12a and 12b operations independent. Optional wavelength division multiplexers (WDM) 17 may also be used for optical pumping of fiber amplifier 15 through the fibers 18. The spectral response of gratings 12a and 12b may have a narrow transmission window to provide narrowband operation of laser.

Figure 7A:
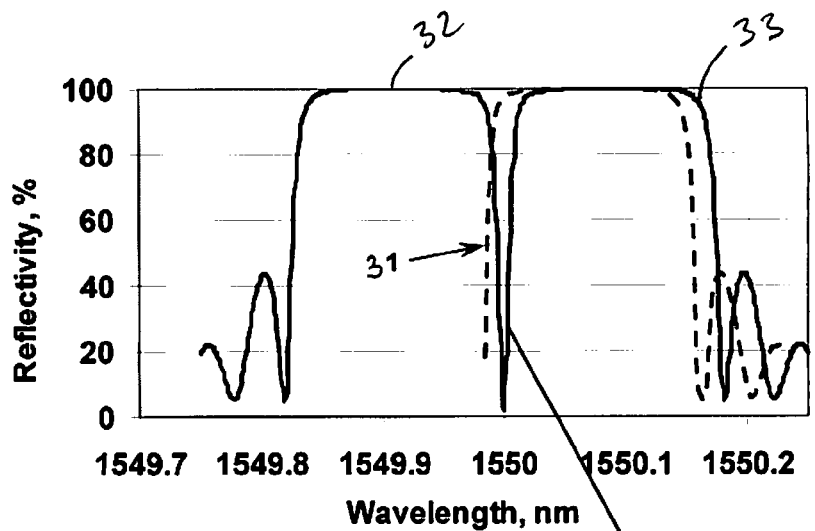
FIG. 7a is a graph of calculated summarized reflectivity of two 1 cm-long gratings with reflection spectras positioned at 1549.9 nm and 1550.1 according to the present disclosure.
Figure 7B:
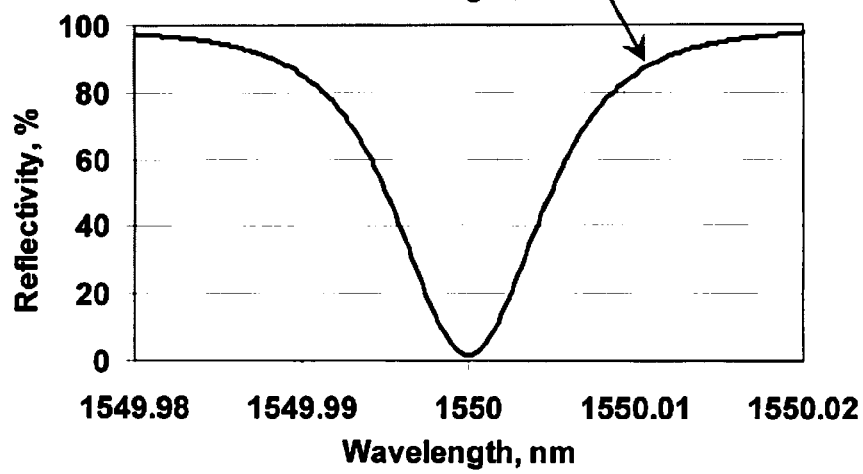

In one exemplary embodiment, the gratings 12a and 12b shown in FIG. 6 may have closely positioned spectra of reflections. For exemplary purposes, a calculated reflectivity of two 1 cm-long gratings with reflection spectras 32 and 33 positioned at 1549.9 nm and 1550.1 nm respectively are shown in FIG. 7a. FIG. 7b shows more detailed spectral structure of the transmission window in the center of spectrum.

In one exemplary embodiment, the reflection spectrum 33 shown in FIG. 7a of the grating 12b shown in FIG. 6 may be shifted as shown by dotted curve 31 in FIG. 7a by the application of the electrical pulse 14. This may be done by applying short electrical pulse 14 to the electrodes 13 disposed, for example, above and below the waveguide 11b. By applying the electrical pulse 14 in the direction opposite to the direction of the laser radiation 21, the electrical pulse 14 modifies the refractive index of waveguide 11b, thereby shifting the reflection spectra of the grating 12b. The reflected optical pulse propagates in the direction opposite to the laser veneration direction 21, is amplified in fiber amplifier 15, and exits the laser cavity through the circulator 19a because of its direction of propagation. Conversely, the laser light propagating in direction 21 is only slightly attenuated by electrical pulse 14's modification of the transmission spectra of grating 12b. The result is the operating wavelength of the ring cavity laser 25 remaining set by the transmission spectra of gratings 12a and 12b. And since gratings 12a and 12b are constructed to experience the same environmental factors, any change in the transmission spectra of grating 12a, for example by temperature changes, is substantially mimicked by grating 12b. Thus, the proposed converter 25 allows development of short optical pulses 22 controlled by electrical pulses 14 at very high frequency. More specifically, converter 25 converts electrical pulses 14 into optical pulses 22. The present disclosure should not be limited by the location of the component as shown in FIG. 6. Although not shown in the figures, in one exemplary embodiment, the fiber amplifier 15, WDMs 17 and fibers 18 may be disposed between circulator 19b and waveguide 11b. In another exemplary embodiment, the fiber amplifier 15, WDMs 17 and fibers 18 may be disposed between waveguide 11a and circulator 19a.

In another exemplary embodiment, a phase-shifted Bragg gratings may be used to obtain a very narrow transmission resonance in the spectral band of grating reflection (see e.g., A. Othonos, K. Kalli, "Fiber Bragg Grating: fundamentals and application in telecommunication and sensing," Chapter 5 (5.3), pp. 203-205, Artech House. Boston, London. 1999).

Figure 8:
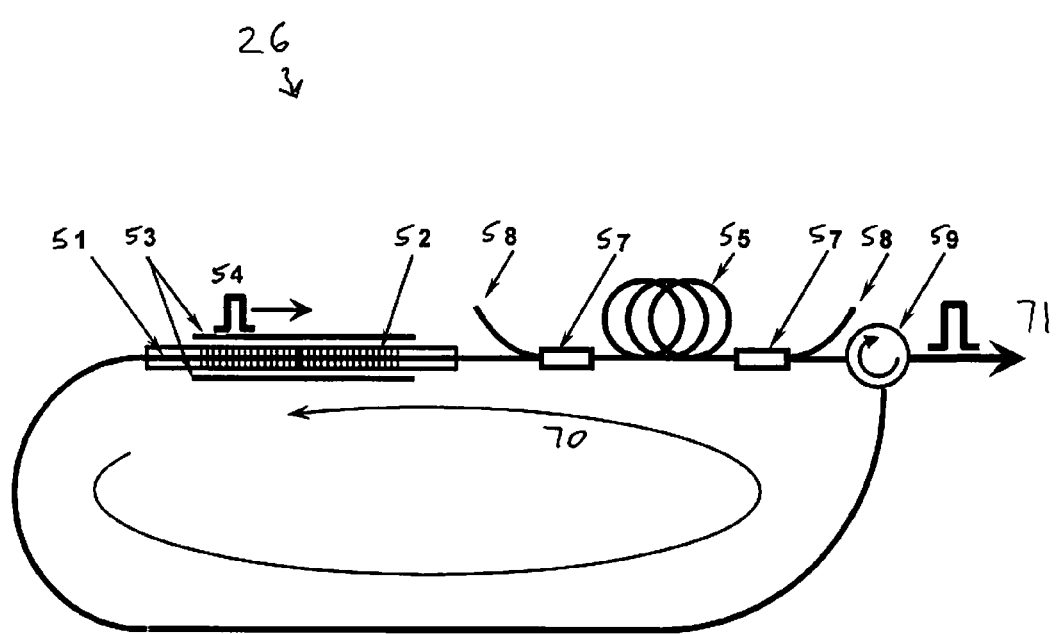
FIG. 8 depicts another self-adjusting converter of electrical pulses into optical output according to the present disclosure.

FIG. 8 depicts an exemplary embodiment of a self-adjusting converter of electrical pulses into optical output using phase-shifted Bragg gratings. FIG. 8 depicts a converter 26 that may be configured with a fiber amplifier 55 providing a generation, the waveguide 51 having a π-phase shift in the middle of its length with the grating 52 providing the narrowband spectrum of generation, and circulator 59 providing unidirectional propagation of laser radiation 70. Wavelength division multiplexers (WDM) 57 may be used for optical pumping of fiber amplifier 55 through the fibers 58.

Figures 9A, 9B:
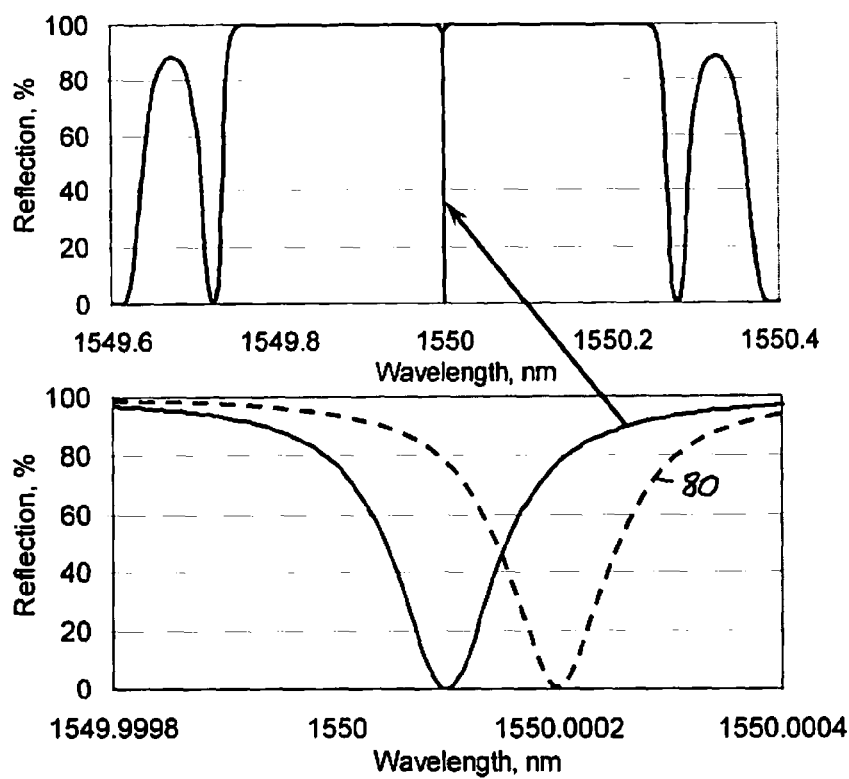
FIGS. 9a and 9b are graphs of the reflection spectrum of 7 mm-length phase-shifted grating on Ti:LiNbO$_3$ waveguide according to the present disclosure.

To demonstrate the advantages of using phase-shifted Bragg gratings, as shown in FIG. 8, the reflection spectrum of a 7 mm-length phase-shifted grating on Ti:LiNbO$_3$ waveguide was calculated. This spectrum is shown in FIG. 9a. FIG. 9a depicts a 7 mm-length grating having a transmission resonance with very sharp spectral change of transmitted/reflected intensity. As shown in FIG. 9b, a considerable change in intensity may be provided by spectral shift of less than 0.1 picometers as shown by the dotted curve 80 in FIG. 9b. This shift is 20 times less than the 2.0 picometer shift shown in FIG. 4. This means that the electrical pulse voltage required for modulation of CW laser radiation may be ~0.003V instead of 0.06V as calculated above. Thus, the proposed converter 26 shown in FIG. 8 allows development of short optical pulses 71 controlled by electrical pulses 54 at very high frequency with increased sensitivity to the magnitude of the electrical pulse. More specifically, converter 26 converts electrical pulses 54 into optical pulses 71. Another advantage of the converter 26 with phase-shifted grating is that only one and shorter in length grating is needed for converter 26's development.

The preceding embodiments convert an input electrical pulse into an optical pulse. Successive optical pulses will repeat the timing of the input electrical pulses as long as the propagation time of the electrical pulse substantially equals the propagation time of the optical pulse. This timing will be insensitive to shifts in the lasing wavelength of the ring cavity laser.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. Other embodiments are within the scope of the claims. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

What is claimed is:

1. A device comprising:
    a first electro-optical waveguide comprising at least one first grating;
    a second electro-optical waveguide comprising at least one second grating;
    a plurality of electrodes disposed adjacent to the first grating and configured to impose an electric field through the first electro-optical waveguide to modify spectra of the first grating;
    a fiber amplifier configured to propagate a laser radiation between the first electro-optical waveguide and the second electro-optical waveguide; and
    at least two circulators associated with the fiber amplifier and the first electro-optical waveguide and the second electro-optical waveguide and configured to provide unidirectional propagation of the laser radiation along the fiber amplifier.

2. The device of claim 1, further comprising:
    one or more wavelength division multiplexers configured to optically pump the fiber amplifier with the laser radiation.

3. The device of claim 1, wherein the laser radiation propagates along a first direction; and wherein the plurality of electrodes impose electric pulses along the first electro-optical waveguide in a direction substantially opposite the first direction.

4. The device of claim 3, wherein output of one of the circulators are optical pulses that correspond to the electric pulses.

5. A method of converting electrical pulses into optical pulses, the method comprising:
    propagating a laser radiation between a first electro-optical waveguide and a second electro-optical waveguide using a fiber amplifier, wherein the first electro-optical waveguide comprises a first grating and a plurality of electrodes adjacent to the first grating to impose an electric field to modify spectra of the first grating, wherein the second electro-optical waveguide comprises a second grating, wherein the first electro-optical waveguide and the second electro-optical waveguide are connected by two circulators configured to provide unidirectional propagation of the laser radiation along a first direction; and
    imposing electric pulses to the plurality of electrodes in a direction substantially opposite the first direction.

6. The method of claim 5, further comprising:
    optically pumping the fiber amplifier with the laser radiation using one or more wavelength division multiplexers.

7. A ring cavity laser comprising:
    a first electro-optical waveguide comprising at least one first grating;
    a second electro-optical waveguide comprising at least one second grating;
    a plurality of electrodes disposed adjacent to the first grating and configured to impose an electric field through the first electro-optical waveguide to modify spectra of the first grating;
    a fiber amplifier configured to propagate a laser radiation between the first electro-optical waveguide and the second electro-optical waveguide;
    a first circulator disposed between an input of the first electro-optical waveguide and an output of the second electro-optical waveguide; and
    a second circulator disposed between an output of the first electro-optical waveguide and on input of the second electro-optical waveguide, wherein the first circulator and the second circulator are configured to provide unidirectional propagation of the laser radiation along the fiber amplifier.

8. The device of claim 7, further comprising:
    one or more wavelength division multiplexers configured to optically pump the fiber amplifier with the laser radiation.

9. The device of claim 7, wherein the laser radiation propagates along a first direction; and wherein the plurality of electrodes impose electric pulses along the first electro-optical waveguide in a direction substantially opposite the first direction.

10. The device of claim 9, wherein output of one of the circulators are optical pulses that correspond to the electric pulses.

11. The device of claim 7, wherein the fiber amplifier is disposed between the input of the first electro-optical waveguide and the first circulator.

12. The device of claim 7, wherein the fiber amplifier is disposed between the output of the first electro-optical waveguide and the second circulator.

13. device of claim 7, wherein the fiber amplifier is disposed between the output of the second electro-optical waveguide and the first circulator.

14. The device or claim 8, wherein the fiber amplifier and the one or more wavelength division multiplexers are disposed between the input of the first electro-optical waveguide and the first circulator.

15. The device of claim 8, wherein the fiber amplifier and the one or more wavelength division multiplexers are disposed between the output of the first electro-optical waveguide and the second circulator.

16. The device of claim 8, wherein the fiber amplifier and the one or more wavelength division multiplexers are disposed between the output of the second electro-optical waveguide and the first circulator.

* * * * *